United States Patent [19]

Mosbacher

[11] Patent Number: 4,647,750

[45] Date of Patent: Mar. 3, 1987

[54] APPARATUS FOR ELECTRIC PRESSURE JOINING, ESPECIALLY PRESSURE WELDING AND PRESSURE SOLDERING

[75] Inventor: Albert Mosbacher, Wettswil, Switzerland

[73] Assignee: H.A. Schlatter AG, Schlieren, Switzerland

[21] Appl. No.: 810,180

[22] Filed: Dec. 18, 1985

[30] Foreign Application Priority Data

Dec. 27, 1984 [CH] Switzerland .......................... 6182/84

[51] Int. Cl.$^4$ ............................................ B23K 11/00
[52] U.S. Cl. .............................. 219/78.01; 219/86.25; 219/88; 219/119
[58] Field of Search ...................... 219/86.25, 86.9, 88, 219/89, 78.01, 119

[56] References Cited

U.S. PATENT DOCUMENTS 2,452,010 10/1948 Woodward ...................... 219/86.25
4,140,891 2/1979 Lenox .................................... 219/89
4,349,718 9/1982 Carota et al. ..................... 219/78.01

*Primary Examiner*—H. Broome
*Assistant Examiner*—Lincoln D. Donovan
*Attorney, Agent, or Firm*—Werner W. Kleeman

[57] ABSTRACT

A first electrode with a first clamping surface and a second electrode with a second clamping surface are moveable towards and away from each other during working cycles of the apparatus. The first and second clamping surfaces face each other and serve to securely clamp a workpiece to be welded and to supply an electrical current required for this operation. The second clamping surface of the second electrode is larger than the first clamping surface of the first electrode, and radial displacing members are provided to displace the second electrode with respect to the first electrode between successive working cycles. This is necessary, particularly during welding or soldering series of small articles, in order to reduce the frequency of wear due to heat accumulation and to reduce the need to frequently exchange the electrodes or electrode inserts carrying the clamping surfaces, which exchange is caused by the heat accumulation. Consequently, different surface sections of the larger second clamping surface of the second electrode face the first clamping surface of the first electrode during successive working cycles.

14 Claims, 4 Drawing Figures

APPARATUS FOR ELECTRIC PRESSURE JOINING, ESPECIALLY PRESSURE WELDING AND PRESSURE SOLDERING

BACKGROUND OF THE INVENTION

The present invention broadly relates to a new and improved construction of an apparatus for electric pressure joining, especially pressure welding and pressure soldering.

In its more specific aspects the present invention relates to a new and improved construction of an apparatus for electric pressure joining, especially pressure welding and pressure soldering, and comprises a first electrode and a second electrode moveable towards and away from each other in acordance with working cycles. The first electrode possesses a first clamping surface and the second electrode possesses a second clamping surface. The first and second clamping surfaces face each other and are intended to securely clamp the workpiece to be welded or soldered therebetween and to feed the necessary electric current required for welding or soldering the workpiece.

In such apparatus the clamping surfaces of the electrodes are conventionally adapted to the size of the workpiece to be welded or soldered. In known machines of the above-mentioned type, heat is accumulated which cannot be sufficiently coped with even by forced or pressure cooling of the electrodes. This is particularly true during batch or series welding or soldering, for example, using hard solder, of relatively small workpieces such as, for example, welding or soldering contacts to the ends of terminal leads. As a result the electrodes or electrode inserts possessing clamping surfaces and inserted into the electrodes, have to be replaced in the known apparatus after a very short period of operation due to sparking and/or wear and/or deformation, all of which result in a corresponding stoppage or shutdown time.

SUMMARY OF THE INVENTION

Therefore, with the foregoing in mind, it is a primary object of the present invention to provide a new and improved construction of an apparatus for electrical pressure joining, especially pressure welding and pressure soldering, and which does not exhibit the aforementioned drawbacks and shortcomings of the prior art constructions.

A further important object of the invention is to provide a new and improved construction of an apparatus for electrical pressure joining, especially pressure welding and pressure soldering, and in which the exchange of electrodes, which causes the frequent shutdown times of the apparatus, is counteracted in an improved manner so that the frequency of the work stoppages is very significantly reduced.

Now in order to implement these and still other objects of the present invention which will become more readily apparent as the description proceeds, the apparatus of the present development is manifested by the features that, the second clamping surface of the second electrode is greater than the first clamping surface of the first electrode, and that displacement means or members are provided for displacing the second electrode with respect to the first electrode between successive working cycles of the apparatus so that during successive working cycles different surface sections or regions of the larger size second clamping surface face the small size first clamping surface of the first electrode.

Due to the fact that during successive working cycles different surface sections or regions of the larger second clamping surface "come into action" and thus are immediately and conjointly heated, the surface sections which have been utilized in the preceding working cycles can be cooled over longer periods, namely when using forced or pressure cooling, and are comparatively cool when placed so as to again face or confront the first electrode. Consequently, also the heating of the first electrode having the smaller clamping surface is reduced which increases its service life.

BRIEF DESCRIPTION OF THE DRAWINGS

The invention will be better understood and objects other than those set forth above, will become apparent when consideration is given to the following detailed description thereof. Such description makes reference to the annexed drawings, wherein throughout the various figures of the drawings there have been generally used the same reference characters to denote the same or analogous components and wherein.

DETAILED DESCRIPTION OF THE PREFERRED EMBODIMENTS

Figures 1, 4:
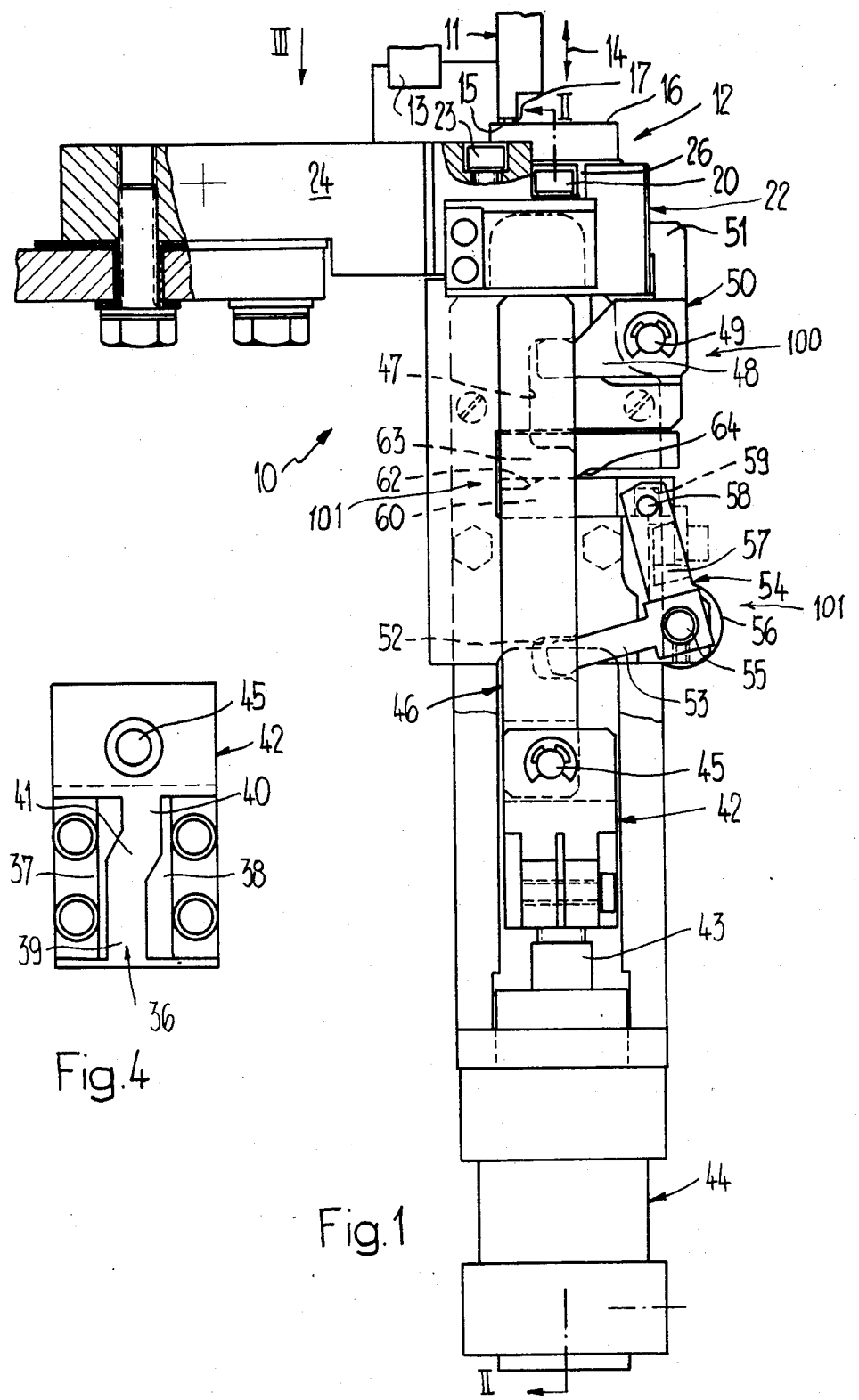
FIG. 1 is a side view of the two electrode arrangements in an exemplary embodiment of the inventive apparatus for electric pressure joining, especially pressure welding and pressure soldering.
FIG. 4 is a top plan view on an enlarged scale looking in the direction of the arrow IV in FIG. 2, of a slide bar or guide track depicted in section in FIG. 2.

Describing now the drawings, it is to be understood that to simplify the showing thereof only enough of the structure of an apparatus for electrical pressure joining, especially pressure welding and pressure soldering has been illustrated therein as is needed to enable one skilled in the art to readily understand the underlying principles and concepts of the present invention. Turning now to the drawings, the construction depicted therein by way of example and not limitation, will be seen to comprise an exemplary embodiment of an electric pressure welding apparatus generally designated by the reference numeral 10.

A first or top electrode 11 and a second or bottom electrode 12 of the electric pressure welding apparatus 10 can be recognized in the drawings. As schematically shown, the first and second electrodes 11 and 12 are connected to a welding current transformer 13 which supplies current pulses to the first and second electrodes 11 and 12 in accordance with the working cycle of the electric pressure welding apparatus 10. As shown by a double-headed arrow 14 the first or top electrode 11 can be displaced towards and away from the second or bottom electrode 12 according to the working cycle of the electric pressure welding apparatus 10. In the lined-up position a workpiece 17 to be welded is fixedly clamped between a first clamping surface 15 of the first or top electrode 11 and a second clamping surface 16 of the second or bottom electrode 12.

Figure 2:
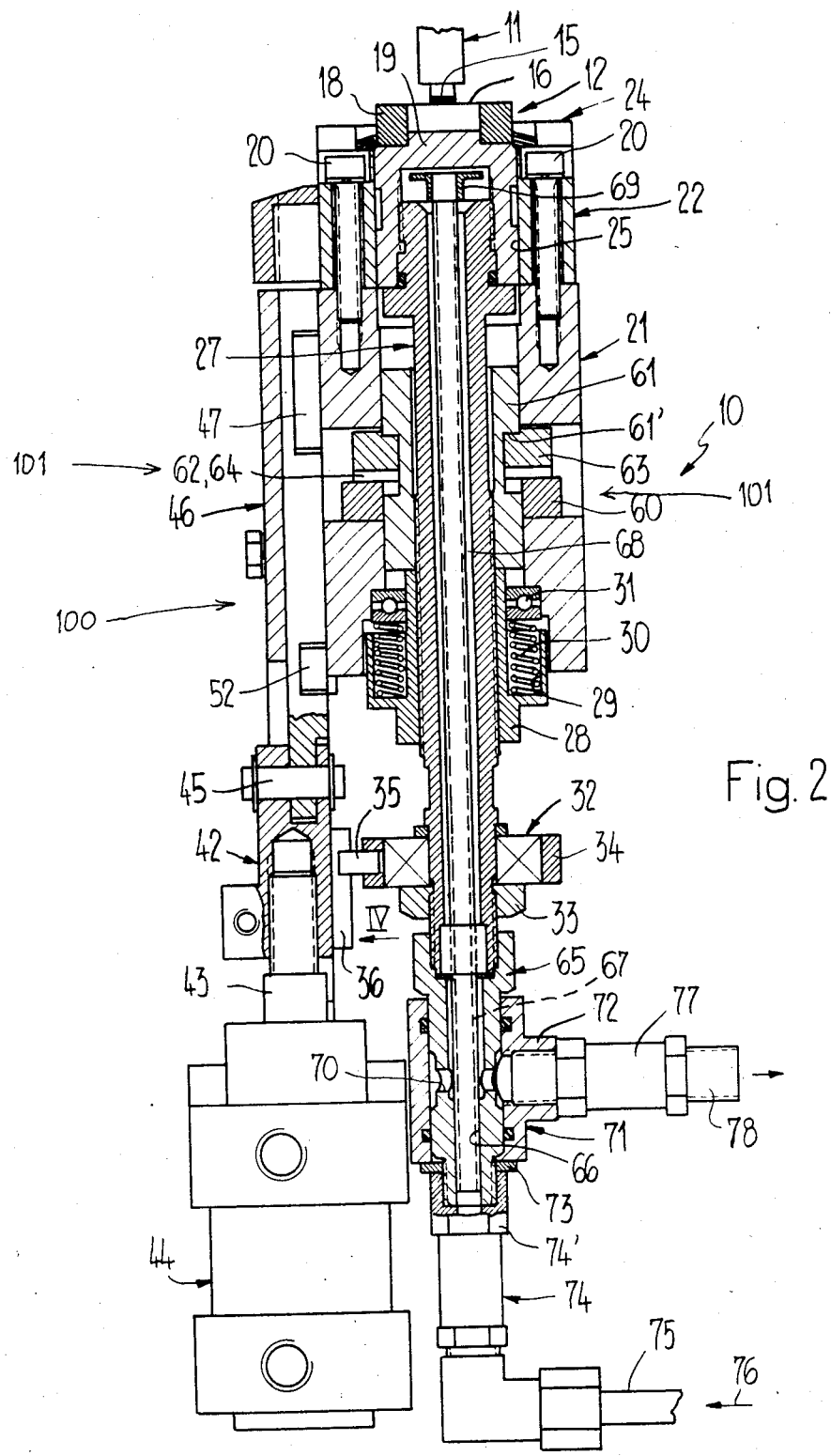
FIG. 2 shows a section approximately along the line II—II of the apparatus shown in FIG. 1.
Figure 3:
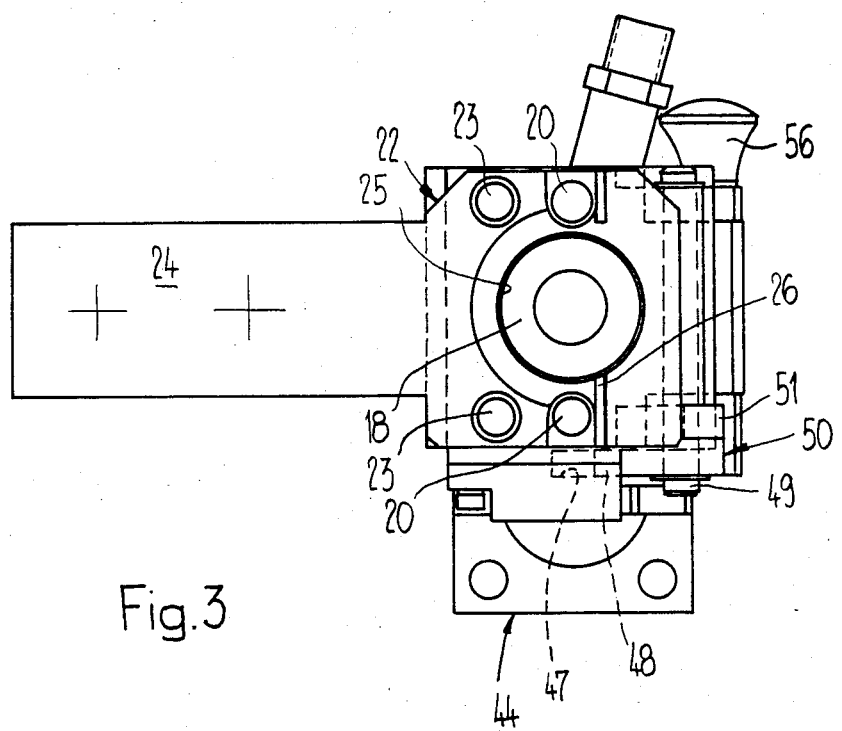
FIG. 3 is a top plan view looking in the direction of the arrow III in FIG. 1 of the apparatus shown in FIG. 1.

From FIG. 2 it can been seen that the second or bottom clamping surface 16 is formed by one end face or surface of an annularly shaped electrode insert 18 which, in turn, is exchangeably mounted in a press fit at the top end of an electrode body 19 and thus is electrically connected therewith. The outer surface of the electrode body 19 is surrounded by a solid stationary current conducting rail or bus bar 24, see FIG. 1, whose front half is constructed in the manner of a collet or collet means 22. A carrier sleeve 21 is bolted to the current conducting rail or bus bar 24 by means of bolts 20 and 23. The collet or collet means 22 possesses a bore 25 having a diameter which is greater by only a small amount than the outer diameter of the outer surface of the electrode body 19. Furthermore, the collet 22 possesses a continuous slot 26, see FIG. 3, which extends approximately radially from the bore 25, such that this bore 25 can be narrowed and thereby the electrode body 19 can be fixedly clamped by means still to be described.

The electrode body 19 is fixedly threaded to the top end of spindle 27 which forms a member of displacing means 100 and is rotatably mounted in the carrier sleeve 21. Furthermore, a clamping sleeve 28 is threaded onto the spindle 27. The clamping sleeve 28 possesses a number of axial bores or holes 29 which are open at one side. Compression springs 30 are accommodated in these bores or holes 29 and the upper ends of these compression springs 30 are supported at the stationary carrier sleeve 21 by means of a thrust bearing 31. In this manner the spindle 27 and conjointly therewith the second or bottom electrode 12 are always downwardly biased.

At the bottom end of the spindle 27 there is seated a freewheel mechanism 32, see FIG. 2. This freewheel mechanism 32 also forms a member of the displacing means 100 and is fixedly clamped to the spindle 27 by means of a nut 33. The freewheel mechanism 32 is blocked in one direction of rotation and provided with an outer ring 34 into which there is inserted a radially outwardly protruding entrainment pin 35. The free end of the entrainment pin 35 engages with a guide track 36, see FIG. 4, which is laterally bounded by two slide bars 37 and 38 and forms a further member of the displacing means 100. As can be further seen in FIG. 4, the guide track 36 possesses two end sections 39 and 40 which are arranged parallel to the spindle 27 but are laterally offset from each other. The two end sections 39 and 40 are connected with each other by means of a central section 41 disposed therebetween. This central section 41 extends at an oblique angle relative to the spindle 27.

The slide bars 37 and 38 are bolted onto a connecting piece 42 which is fixedly clamped at one of its ends to the end of a piston rod 43 of a piston-cylinder aggregate 44. A slide 46 extends substantially parallel to the spindle 28 and is parallelly reciprocatable relative thereto. The slide 46 forms a still further member of the displacing means 100 and is linked to an other end of the connecting piece 42 by means of a link pin 45. An elongate recess 47 is formed in the slide 46 and extends in the direction of the spindle 27. Into the elongate recess 47 there engages substantially without lateral play, one end of a first arm 48 of a clamping lever 50 which is thus coupled to the slide 46 and which is further linked to the carrier sleeve 21 by means of a pin 49. A second arm 51 of the clamping lever 50 is arranged in an offset relationship longitudinally of the pin 49 with respect to the first arm 48 and its free end engages the outside of the collet or collet means 22 in a position adjacent the slot 26 and thus is operatively connected with the collet or collet means 22.

The following method of operation results from the foregoing description of the inventive electric pressure welding apparatus 10:

As long as the piston rod 43 of the piston-cylinder aggregate 44 which, for example, may constitute a double-acting aggregate, remains in its retracted position, the second arm 51 of the clamping lever 50 presses upon the collet 22. The electrode body 19 thus remains fixedly clamped and the spindle 27 is prevented from rotation. When, however, the piston rod 43 is upwardly extended the slide 46 is also upwardly pushed by means of the connecting piece 42. Consequently, the top end of the elongate recess 47 releases the first arm 48 of the clamping lever 50 and the second arm 51 no longer presses upon the collet 22. The electrode body 19 can now rotate in its sliding fit in the bore 25. Likewise the spindle 27 can now rotate.

At the same time the axially immovable entrainment pin 35 travels downwardly from the top in the guide track 36 and passes through the angled central section 41. Thereupon the outer ring 34 is rotated to some extent in that direction in which the freewheel mechanism 32 blocks. Conjointly therewith also the spindle 27 and therewith the electrode body 19 including the electrode insert 18 are rotated about an angular extent or predetermined angle which, inter alia, depends upon the lateral offset of the end sections 39, 40 of the guide track 36.

During this rotational movement, the second clamping surface 16 is rotated by this predetermined angle about a central axis which extends perpendicular to this second clamping surface 16. As soon as the piston rod 43 is again retracted, the entrainment pin 35 passes through the guide track 36 from the bottom to the top without, however, effecting a rotation of the spindle 27 due to the fact that the freewheel mechanism 32 does not transmit this rotating movement of the outer ring 34. At the end of the retraction movement of the piston rod 43 the upper end of the elongate recess 47 again contacts the first arm 48 which pivots the clamping lever 50, as viewed in FIG. 1, in an anti-clockwise direction. The second arm 51 is thus caused to again clamp the collet 22.

In the depicted inventive electric pressure welding apparatus 10 there are provided further selectively utilizable displacing means 101 which, after each welding cycle, permit the electrode body 19 and its electrode insert 18 not only to be rotated but also and simultaneously to be downwardly displaced by a certain extent. Such further displacing means 101 can be very useful or necessary in the interest of automatically feeding and removing workpieces 17 when, for example, these workpieces 17 possess a profile and the clamping surfaces of the electrodes possess a complementary shape with respect to this profile.

The slide 46 possesses a further recess 52 which forms part of the further displacing means 101 and into which there engages with the least possible play a first arm 53 of an angle lever 54 of the further displacing means 101. The angle lever 54 is mounted on a stationary axle or pin 55 which can be axially withdrawn for removing the angle lever 54 by means of a knob or button 56.

As can be seen from FIG. 1 a second bifurcated arm 57 of the angle lever 54 carries a pin 58 which extends parallel to the aforementioned stationary axle or pin 55 and engages a notch 59 at the bottom side of a key member 60. The key member 60 is a member of the further displacing means 101 and is constructed approximately in the shape of a horse shoe and, as viewed in FIG. 1, engages from the right-hand side around a lift sleeve 61 which is also threaded onto the spindle 27, see FIG. 2. The side of the key member 60 opposite to the notch 59 possesses a push or thrust surface with a sloping step 62. A lifting fork 63 constitutes a still further key member of the further displacing means 101 and cooperates with the key member 60 and is also constructed in the shape of a horse shoe. However, the lifting fork or further key member 63 engages around the lift sleeve 61 from the left as viewed in FIG. 1, and centers itself on the lift sleeve 61. The lifting fork or further key member 63 also possesses a push or thrust surface provided with a sloping step 64 on the side facing the key member 60. The lifting fork or further key member 63 is stationarily arranged relative to the spindle 27 and of complementary shape with respect to the cooperating key member 60.

When the slide 46 is lifted by means of the piston rod 43 the angle lever 54 carries out a clockwise rotation, see FIG. 1. The pin 58 at the second arm 57 of the angle lever 54 thereby displaces the key member 60 transversely relative to the spindle 27. As soon as the sloping steps 62 and 64 bear upon each other the lifting fork 63 can be lowered by an amount which corresponds to the height of the sloping steps 62 and 64. Such lowering of the lifting fork 63 is rendered possible because of the pressure which is exerted upon the shoulder 61' of the lifting fork 63 by means of the lift sleeve 61 under the action of the springs 30. Due to the fact that at the same time the clamping lever 50 has loosened or released the collet or collet means 22, the spindle 27 and therewith the electrode body 19 is not only rotated to some extent as described hereinbefore but simultaneously is also lowered. When the slide 46 is retracted the spindle 27 is again upwardly displaced via the lift sleeve 61 and against the force of the springs 30. Thereafter the clamping lever 50 recloses the collet 22. A new working cycle may then commence. If the lowering of the electrode body 19 is not required, the angle lever 54 is simply removed by withdrawing its stationary axle or pin 55.

At the bottom end of the spindle 27, which constitutes a hollow spindle, there are mounted cooling means for forced or pressure cooling, by means of a coolant, the electrode body 19 which has the shape of an inverted cup. These cooling means contain a connecting tube 65 which is threaded onto the bottom end of the spindle 27 with the interposition of a seal. This connecting tube 65 possesses a continuous bore or hole which is stepped approximately at its center. In a smaller diameter section of this bore 66 there is inserted a riser tube 67 which extends upwardly in the spindle 27 to its top end with the formation of a jacket space 68. At the top end of the spindle 27 the riser tube 67 is fitted with a distributing body 69.

The connecting tube 65 is provided with through-passing transverse bores or holes 70 in the region of the greater diameter of the bore 66. In the region of these transverse bores or holes 70, the connecting tube 65 is surrounded by a coupling 71 which is sealed against the outside of the connecting tube 65 and possesses a branch connection 72.

To the lower end of the connecting tube 65 there is threaded, with the interposition of a seal 73, an elbow 74 which also fixes the axial position of the coupling 71. An infeed tube 75 is connected with the elbow 74 and conducts, i.e. supplies a coolant in the direction of the arrow 76.

A connecting nipple 77 is threadably connected with the branch connection 72 and is connected with an outfeed tube 78.

When a coolant is supplied under pressure to the infeed tube 75, the coolant flows through the elbow 74 into the riser tube 67, which is anchored in the connecting tube 65, and through such riser tube 67 up to the distributing body 69. The latter causes the coolant to cover the free inner wall of the electrode body 19. Subsequently the coolant flows through the free jacket space 68 back to the connecting tube 65 and passes out therefrom through the transverse bores or holes 70. The coolant is then received by the coupling 71 and supplied to the outfeed tube 78 via the branch connection 72.

Due to the fact that the spindle 27 carries out a rotating movement and, if desired, an up-and-down movement, the coupling 71 is rotatably although sealingly mounted at the connecting tube 65. The component 74' of the elbow 74 which is fixedly threaded immediately to the bottom end of the spindle 27, must be constructed such as to be rotatable relative to the elbow 74. The axial movements of the spindle 27 are accommodated by flexibly constructing the infeed tube 75 and the outfeed tube 78.

While there are shown and described present preferred embodiments of the invention, it is to be distinctly understood that the invention is not limited thereto, but may be otherwise variously embodied and practiced within the scope of the following claims.

Accordingly, What I claim is:

1. An apparatus for electric pressure joining, especially pressure welding and pressure soldering, comprising:
   a first electrode possessing a first clamping surface;
   a second electrode possessing a second clamping surface;
   said first electrode and said second electrode being moveable relative to each other in accordance with a working cycle of the apparatus;
   means for moving said first electrode and said second electrode relative to each other in accordance with said working cycle of the apparatus;
   said first electrode and said second electrode being arranged such that said first clamping surface and said second clamping surface face each other;
   said first clamping surface and said second clamping surface serving to clamp therebetween a workpiece to be pressure joined and to supply the necessary electric current for said pressure joining operation;
   said second clamping surface of said second electrode being greater than said first clamping surface of said first electrode;
   displacing means for displacing said second electrode relative to said first electrode between successive working cycles of the apparatus; and
   said displacing means displacing said second electrode relative to said first electrode such that different surface portions of said second clamping surface of the second electrode face said first clamping surface of said first electrode during different working cycles of the apparatus.

2. The apparatus as defined in claim 1, wherein:
   said first electrode is stationarily arranged and said second electrode is displaceable by said moving means towards said first electrode at the start of said working cycle.

3. The apparatus as defined in claim 1, wherein:
said greater second clamping surface of said second electrode is substantially circularly shaped.

4. The apparatus as defined in claim 1, wherein:
said greater second clamping surface of said second electrode is substantially annularly shaped.

5. An apparatus for electric pressure joining, especially pressure welding and pressure soldering, comprising:
a first electrode possessing a first clamping surface;
a second electrode possessing a second clamping surface;
said first electrode and said second electrode being moveable relative to each other in accordance with a working cycle of the apparatus;
means for moving said first electrode and said second electrode relative to each other in accordance with said working cycle of the apparatus;
said first electrode and said second electrode being arrnged such that said first clamping surface and said second clamping surface face each other;
said first clamping surface and said second clamping surface serving to clamp therebetween a workpiece to be pressure joined and to supply the necessary electric current for said pressure joining operation;
said second clamping surface of said second electrode being greater than said first clamping surface of said first electrode;
displacing means for displacing said second electrode relative to said first electrode between successive working cycles of the apparatus;
said displacing means displacing said second electrode relative to said first electrode such that different surface portions of said second clamping surface of the second electrode face said first clamping surface of said first electrode during different working cycles of the apparatus;
said first electrode being stationarily arranged and said second electrode being displaceable by said moving means towards said first electrode at the start of said working cycle;
said second clamping surface defining a center and an axis extending substantially perpendicular to said center; and
said displacing means for displacing said second electrode which possesses said greater second clamping surface, between said successive working cycles, being constructed for rotating said second clamping surface about said axis through a predetermined angle.

6. The apparatus as defined in claim 3, wherein:
said second electrode further comprises an electrode body;
an electrode insert exchangeably inserted into said electrode body of said second electrode; and
said greater second clamping surface being formed at said electrode insert.

7. The apparatus as defined in claim 4, wherein:
said second electrode further comprises an electrode body;
an electrode insert exchangeably inserted into said electrode body of said second electrode; and
said greater second clamping surface being formed at said electrode insert.

8. An apparatus for electric pressure joining, especially pressure welding and pressure soldering, comprising:
a first electrode possessing a first clamping surface;
a second electrode possessing a second clamping surface;
said first electrode and said second electrode being movable relative to each other in accordance with a working cycle of the apparatus;
means for moving said first electrode and said second electrode relative to each other in accordance with said working cycle of the apparatus;
said first electrode and said second electrode being arranged such that said first clamping surface and said second clamping surface face each other;
said first clamping surface and said second clamping surface serving to clamp therebetween a workpiece to be pressure joined and to supply the necessary electric current for said pressure joining operation;
said second clamping surface of said second electrode being greater than said first clamping surface of said first electrode;
displacing means for displacing said second electrode relative to said first electrode between successive working cycles of the apparatus;
said displacing means displacing said second electrode relative to said first electrode such that different surface portions of said second clamping surface of the second electrode face said first clamping surface of said first electrode during different working cycles of the apparatus;
said displacing means containing a spindle possessing one end;
said spindle being mounted for rotation in two rotational directions;
said second electrode being fixed at said one end of said spindle;
said displacing means further containing:
a freewheel mechanism seated at said spindle and blocking in one of said two rotational directions of rotation of said spindle;
said freewheel mechanism containing an entrainment pin;
said displacing means further containing a guide track reciprocatable substantially parallel to said spindle;
said entrainment pin of said freewheel mechanism engaging said guide track; and
said guide track at least partly extending at an oblique angle relative to said spindle.

9. The apparatus as defined in claim 8, further comprising:
collet means releasably clamping said second electrode;
said collet means being operatively associated with said reciprocatable guide track of said displacing means; and
said collet means releasing and clamping said second electrode in synchronism with said reciprocating movement of said guide track of said displacing means.

10. The apparatus as defined in claim 9, wherein:
said displacing means further containing a slide;
said slide being reciprocatable substantially parallel to said spindle;
said guide track being secured to said slide;
a clamping lever coupled to said slide; and
said clamping lever being operatively connected with said collet means for releasing and clamping said collet means and said second electrode in accordance with said reciprocating movement of said slide.

11. The apparatus as defined in claim 10, further including:

further displacing means for selectively and axially displacing said second electrode simultaneously with the operation of said displacing means serving for rotating said second clamping surface of said second electrode.

12. The apparatus as defined in claim 10, wherein:
said further displacing means contain:
an angle lever possessing a first arm and a second arm;
a stationary axle upon which said angle lever is selectively placed;
said first arm of said angle lever being coupled to said slide;
a key member transversely displaceable relative to said spindle;
said second arm of said angle lever being coupled to said key member;
a further key member which is complementary shaped with respect to said key member;
said further key member being stationarily arranged relative to said spindle; and
said key member cooperating with said further key member.

13. The apparatus as defined in claim 1, further including:
means for pressure cooling said second electrode.

14. The apparatus as defined in claim 8, wherein:
said spindle constitutes a hollow spindle having a further end; and
cooling means connected to said further end of said spindle for supplying and draining coolant to and from said second electrode.

* * * * *